United States Patent [19]
Hahn et al.

[11] Patent Number: 4,800,050
[45] Date of Patent: Jan. 24, 1989

[54] ADAPTIVE CONTROL PROCESS FOR FOAMING AND FUSING PLASTICS

[75] Inventors: Ortwin Hahn, Hüfferweg 9, Paderborn, Fed. Rep. of Germany, 4790; Johannes Hümmler, Finnentrop, Fed. Rep. of Germany

[73] Assignee: Ortwin Hahn, Paderborn, Fed. Rep. of Germany

[21] Appl. No.: 932,829

[22] Filed: Nov. 20, 1986

[30] Foreign Application Priority Data

Nov. 22, 1985 [DE] Fed. Rep. of Germany ....... 3541258

[51] Int. Cl.$^4$ ........................ C08J 9/22; B29C 67/22
[52] U.S. Cl. ................................ 264/40.6; 264/40.1; 264/51; 264/DIG. 9; 264/DIG. 10; 425/4 R; 425/143; 425/145; 425/149
[58] Field of Search .................. 264/40.6, 51, 40.4; 425/143, 145, 149, 4 R

[56] References Cited

U.S. PATENT DOCUMENTS

| | | | |
|---|---|---|---|
| 4,456,443 | 6/1984 | Rabotski | 264/40.6 X |
| 4,482,306 | 11/1984 | Hahn | 264/40.6 X |
| 4,615,849 | 10/1986 | Hahn | 264/40.6 X |

FOREIGN PATENT DOCUMENTS

3243632 5/1984 Fed. Rep. of Germany .

*Primary Examiner*—Philip Anderson
*Attorney, Agent, or Firm*—William A. Drucker

[57] ABSTRACT

A control process for foaming and fusing plastics in a foaming and fusing device, and a fusing device for carrying out the process, in which the control process works in cycles, each cycle consists of phases which are at least an injection phase, a heating phase, a fusion phase, a cooling phase and a mould release phase, such phases being started and completed depending on control criteria comprising a time period, a pressure or a temperature limit value for the conditions evolving in the device such control criteria belonging to a certain cycle comprising a control criteria set, and with each cycle quality values of predetermined characteristics determined by measurements taken from the respective plastic part or an agglomerate cake situated in the device, a new set of control criteria being generated for each new cycle from prior control criteria depending from the quality values measured with such prior cycle of the control process, wherein the quality values of each cycle are combined to a deviation which deviation together with the control criteria set of the respective cycle are stored in a control device store up to a predetermined number of such stored sets, and criteria averages are determined from each of the store control criteria and an average of the stored quality deviations is determined, and for each cycle a new set of control criteria is determined through statistical variations of one or more of the control criteria around their criteria average with a variance determined according to the average quality deviation, such new set of control criteria is preset for the control of the next working cycle and the related quality values and the deviation is determined which is compared to the stored deviations and if it is smaller than one of the stored deviations, the set with the largest deviation in the store is replaced by the new one.

19 Claims, 5 Drawing Sheets

$$W_n(x, Va) = 1 : (1 + (x_n : Va_n)^2) \; ; \; -2 \leq x_n \leq 2 \; ; \; 0 \leq Va \leq 1 \; ; \quad (I)$$

$$K_{n+1}(x, y, Va, Tb, n) = Tb \cdot x_n \; : \; 2 + Vk_n \; ; \; y_n \leq W_n \; ; \quad GWu \leq K_{n+1} \leq GWo \; ; \quad (II)$$

$$Tb = GWo - GWu \; ; \quad (III)$$

$$R \left\{ 1 \geq y_n \geq W_n \; ; \; K'_{n+1} \leq GWu \; ; \; K'_{n+1} > GWo \right\} = 1 \; ; \quad (IV)$$

$$Vk_n = \frac{1}{m} \sum_{i=1}^{m} K_i (Ai_n) \; ; \quad (V)$$

$$Ai_n = \left\{ Ai_{n-1} \, , \, A_n \diagdown \, \varepsilon_{max} \left\{ Ai_{n-1} \, , \, A_n \right\} \right\} \; ; $$

$$Va_n = \frac{1}{m} \sum_{i=1}^{m} \varepsilon Ai_n \; . \quad (VI)$$

Fig. 8

ADAPTIVE CONTROL PROCESS FOR FOAMING AND FUSING PLASTICS

SPECIFICATION

The invention relates to a control process for foaming and fusing plastics in a foaming and fusing device with a fusion chamber, which is connected with a controllable injector for prefoamed and possibly intermediately stored granular plastics material and which is enclosed by mould walls penetrated by nozzles, which mould walls are surrounded by steam chambers, which are connected to a controllable heating, cooling and process media supply and removal device, with a controllable closing device for the mould walls to release from the mould a fused plastics part and with pressure and/or temperature measuring probes, which are arranged in the fusion chamber, the mould walls, the steam chambers and/or the supply and removal device and which are connected with the input side of a control device, whose output signals are conveyed to the injector, the supply and removal device and the closing device, and, corresponding to an evaluation of the measuring signals, the control device controls in phases assigned to successive working cycles, i.e. at least injection, heating, fusion, cooling and mould release phases which together form one working cycle, the evaluation being effected in that comparison pressures or temperatures are determined depending on predetermined characteristic quality values of the fused plastic parts, from the arrival at which comparison pressures or temperatures, possibly in conjunction with predetermined times, control criteria are generated which control the completion or start of the appropriate phase.

PRIOR ART

It is known from DE-P No. 32 43 632 to establish the predetermined pressure or temperature values from the various dependences of the process on the material data of the plastics material, the characteristic values of the fusion mould and characteristic installation values of the heating, steam and cooling media supply, taking into account the quality required of the fused plastics part. Very lengthy and expensive preliminary work is necessary for this as tests have to be carried out using the different materials, which are variously prefoamed and intermediately stored, so as to establish the dependences. Furthermore, the characteristic values of each fusion mould have to be established, into which enter the dimensions of the fusion chamber, the steam chamber and the mould wall, the evaporation resistance of the nozzles in the chamber wall and possibly peculiarities in the shape of the fusion chamber.

Moreover, the characteristics of the supply equipment with regard to media preparation, such as control accuracy and time constants of the steam pressure rise or drop, coolant temperature etc., have to be established and taken into account in the determination of the temperature and pressure for the completion of the various process phases. To establish the time constants the differences in the temperatures or pressures in the mould wall, steam chamber and fusion chamber are evaluated in their temporal development. These known methods of determinatin result in only limited accuracy, in spite of the high amount of expenditure necessary, as external influences, e.g. idle times, reduced heat output from the steam generator, leakages at the point of closure of the fusion chamber etc., can hardly be included in the calculations in their entirety.

In the context of the preliminarily investigated material data variations, the characteristic mould values established and the characteristic values of the supply equipment it was shown in DE-P No. 32 43 632 that it is possible to adapt the process by automatic, systematic, stepwise alteration of the predetermined operating values, such as switching pressures and temperatures or times, to altered conditions, e.g. altered storage time of the prefoamed material and hence greater air absorption and lower moisture content of the plastics beads. This is done by continuous assessment of the finished plastics parts and evaluation of the pressure and temperature build-up in the fusion chamber.

This method of adaptation fundamentally presupposes, however, that the relationship of the established quality assessment criteria and the behaviour of the measured values with the individual control criteria to be changed is known or has been established. It is thus only possible to a limited degree for a control process based on these relationships and worked out for one device to be transferred to another fusion mould or another supply device, as a fresh determination of the different characteristic values is imperative.

Furthermore, it is known from Rechenberg's "Evolutionsstrategie" ("Evolution strategy"), Fr. Frommann Verl. Stuttgart-Bad Cannstadt, 1973, p. 38, to implement self-optimizing control systems in which the parameters in a controlled process are systematically and statistically varied according to a control criterion, so that an optimum control characteristic is set without prior knowledge of the signal to be controlled, and the control characteristic also conforms itself to alterations in the signal character. The disadvantage of this is, however, the risk that natural oscillations may occur if the stability range is exceeded, although the control system demonstrated is very simple and easily comprehensible in comparison with the foaming and fusing device. In this latter case, therefore, all themore undesired control behaviour has to be expected.

OBJECT OF THE INVENTION

The problem on which the invention is based is that of providing a control process for the foaming and fusing device which makes it possible to process plastics material lying within a wide tolerance range as far as prefoaming and intermediate storage characteristics are concerned, such as density and air, propellant gas and moisture content, into foamed and fused and extensively dry parts of predetermined quality, the respective material and fusion mould characteristics and the characteristics of the supply device being taken into account self-optimizingly by the control process and not having to be defined beforehand or continuously.

SUMMARY OF THE INVENTION

The problem is solved in that the control criteria are stored in sets belonging to the working cycles together with a deviation from the characteristic quality values, which quality deviation was established by measurements taken at the respective plastics part or agglomerated cake, and then a predetermined number of sets with the slightest quality deviations are reselected from these sets and criteria averages are determined for their control criteria, and the average of the accompanying quality deviations is determined and a new set of control criteria is defined within predetermined tolerance ranges by statistical variation of one or more of the control criteria around its criteria average with a variance determined according to the average quality deviation, this new set being stored and preset to control the next working cycle.

Further advantageous embodiments are indicated in the subclaims.

In a simplest embodiment of the fusing device, this latter has no pressure or temperature sensors; rather, it is controlled merely by preset times as control criteria for the individual phases.

In a special embodiment of the fusing device, this latter is additionally equipped in a known way with pressure and/or temperature probes, which are arranged in the fusing chamber, the mould walls, the steam chambers and/or the supply and removal device and are connected with the input side of the control device, which evaluates the measuring signals and at the same time determines control criteria for the next working cycle, these being comparison pressures or temperatures possibly in conjunction with predetermined times, for the completion or start of each relevant phase. These control criteria are determined according to the given solution by statistical variation, average generation and variance control from cycle to cycle.

Advantageously, at least one of the control criteria is generated to evaluate the pressure differential between a fusion chamber pressure and a steam chamber pressure or between the two steam chamber pressures or a temperature differential between the temperature of an agglomerated cake in the fusing chamber and a mould wall or steam chamber temperature.

Evaluation of the pressure or temperature differentials has the advantage that the pressure fluctuations or temperature adjustments, which are caused by the intermittent demand on the supply equipment, the fluctuations in control of the supply equipment, the mould wall thermal time constant etc., have hardly any effect, as they are extensively compensated. This represents an effective measure against the occurrence of control swings during automatic statistical variation of the control criteria.

The increase in differential pressure provides a gauge for the fusion state and it can therefore be advantageously used to determine the end of the heating and fusing phase. Furthermore, if the material, for example expandable polyethylene, has a high propellant gas content, the differential pressure drops only slowly in the cooling phase. Thus the mould-release time can be determined therewith.

The temperature differential between the agglomerated cake and mould wall temperatures exhibits characteristic behaviour during the fusing phase, as it drops relatively by several degrees Kelvin after reaching the temperature necessary for good fusion of the plastics beads, such that from the time this maximum is reached it is possible to determine the end of the fusion phase. In addition, agglomerated cakes comprising materials with a high propellant gas content, with which a risk of deformation exists if they are removed from the mould too early, i.e. in too soft or pressurized a state, cool relatively slowly, although rapid cooling of the mould wall occurs independently of the propellant gas content, so that the temperature differential is particularly suitable for determining mould-release time.

Furthermore, it is advantageous to derive equivalent parameters for quality assessment from the data measurable at the agglomerated cake during the process, in order to simplify routine testing, so that in the adapted state of the process quality assessment at the finished plastics part is at least partially replaced. The temporal differential pressure drop after cross steam treatment can act as a gauge of inner fusion and thus of the strength of a plastics part, after steam pressure supply has been halted. The pressurized steam in one of the steam chambers can, if fusion is good, only escape slowly into the other steam chamber, which, moreover, is open for steam removal. This test can also be carried out with compressed air instead of steam. In that case the influence of condensation on the measurement of the pressure drop is less significant. In a further test phase after high pressure steam treatment the temporal pressure drop in one of the closed steam chambers in relation to the open one located on the other side can, accordingly, act as an indication of fusion altogether and especially of the surface, as a replacement, therefore, for the measurement of surface roughness. Thus, within certain limits quality deviations can be determined from the agglomerated cake rather than the plastics part.

The statistical variation of the control criteria within predetermined limits makes it possible to find optimum operation, without the individual relationships between the influence variables, the control criteria and the characteristic quality values being previously known. The whole range permitted by the predetermined limit values is gradually covered by the statistical variation, so that run-up to a secondary optimum is prevented and suitable cooperation of the control criteria with possible alterations in the influence variables is ensured. By reducing the variance for slight deviations from the optimum quality it is possible to achieve operation of the fusion process in the vicinity of said optimum quality.

In addition to evaluation of the characteristic quality values, a technico-economic assessment can also be included in the determination of variance. Thus, an important evaluation yardstick is the cycle time, which is provided by the sum of the phase times, and the energy and media consumption, i.e. of steam, cooling water, cooling air, vacuum etc.

The control process can be used both for relatively simple fusion processes and for those involving unilateral or multilateral cross steam treatment, coupled or uncoupled heating and process steam piping and single- or multi-stage cooling by cooling water, compressed air or a vacuum. It is also suitable for fusion devices with several different fusing chambers.

Tests have shown that the adaptability of the control process is so extensive that prefoamed materials with very different propellant gas contents and high or low air contents can be processed into plastics parts of predetermined quality, i.e. largely independently of preprocessing.

BRIEF DESCRIPTION OF THE DRAWINGS

The process is described by way of example with the aid of FIGS. 1 to 7.

DESCRIPTION OF THE PREFERRED EMBODIMENT

Figure 1:
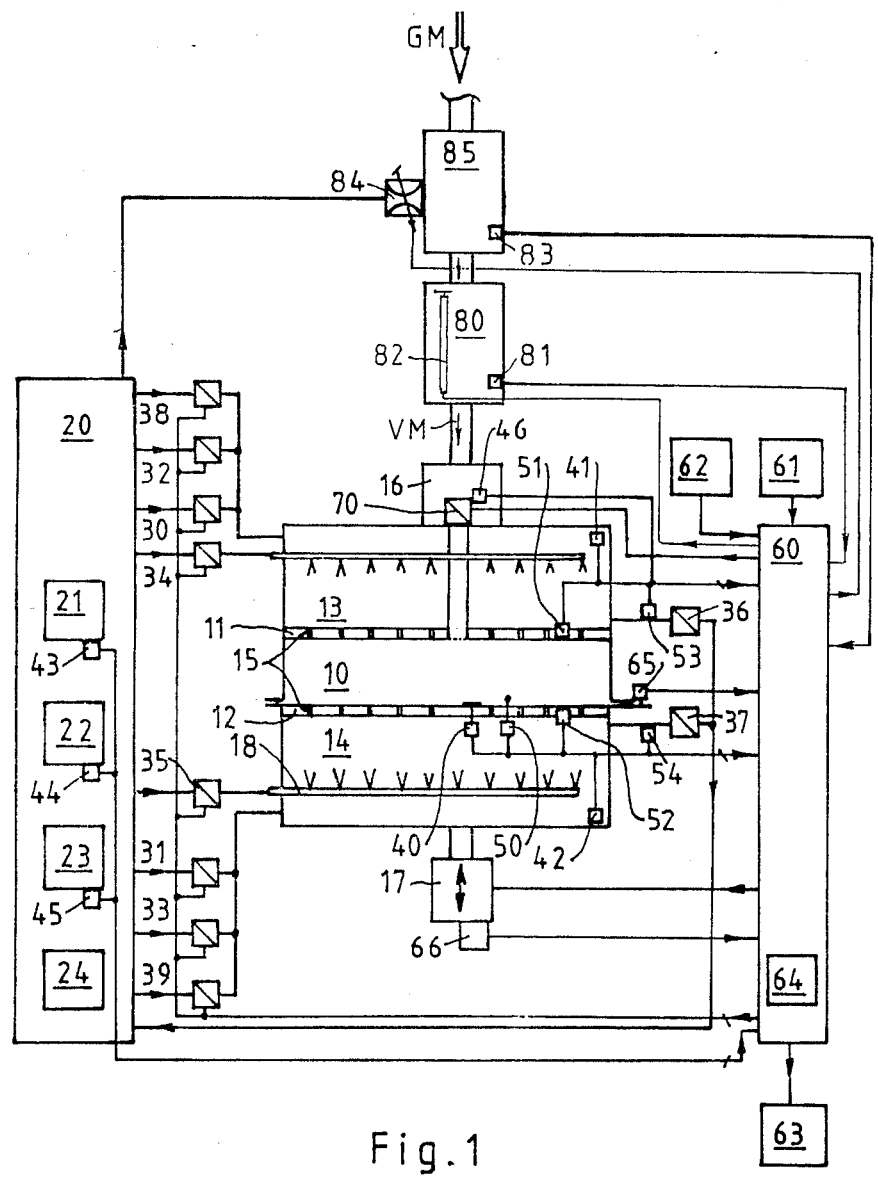
FIG. 1 is a diagrammatic representation of a fusing device with its supply and control device.

FIG. 1 shows a fusing device of known construction. The agglommerated cake is situated in the fusing chamber (10), which is enclosed by the mould walls (11, 12). These are connected by nozzles (15) to the steam chambers (13, 14) respectively surrounding them. A pneumatically driven injector (16) for the prefoamed and intermediately stored material (VM) is guided into the fusing chamber (10) through the steam chamber (13). The mould halves consisting of the steam chambers (13, 14) and the mould walls (11, 12) are positioned displaceably against each other. They can be opened by the closing gear (17) to release from the mould the finished blank. Cooling water nozzles (18) are located in the steam chambers and distribute cooling water over the mould walls.

The supply and removal device (20) consists in the known way of a controlled steam generator (21), an air compressor (22), a vacuum generator (23) and a cooling water cooler (24). The media prepared therewith are connected via controllable valves (30 to 39) to the steam chambers.

The control inputs of the valves, as well as of the injector valve (70) and the closing gear (17), are connected with the outputs of a control device (60). The pressure and temperature sensors (40-46; 50-54) lead to the input side thereof. Furthermore, a clock (61), an input device (62), e.g. a keyboard, and an output device (63), e.g. a printer, are connected with the control device (60). The control process sequence and the predetermined data, the limit values and the respective measured values, the control criteria, characteristic quality values, the process state etc. are contained in the memory (64) of the control device.

The granular material (GM) is prefoamed to a predetermined degree in the prefoaming device (85), which is acted upon by foaming steam via a controllable valve (84) and whose foaming function is monitored by evaluation of the signals of the sensors (83), preferably for material density and temperature, under the control or regulation of the control device (60), and is then supplied to a storage and drying device (80), whence the fully conditioned material (VM) is taken by the injector (16) to the mould cavity. The drying device (80) comprises sensors (81) for the moisture content of the material by means of which the temperature and/or air velocity or material flow rate are controlled via the control device (60).

In this way the characteristics of the prefoamed material (VM) made available for fusion are kept within certain limits and near preset values. These limits and preset values are advantageously established in one of the control processes superordinate to or coordinated with the control of the fusion process, determination of these limit and preset values as prefoaming control criteria being effected by variation in principle in the same way as that of the fusion control criteria.

In this way it is possible to achieve optimum operation of the whole device, leading to minimum energy consumption and the shortest possible fusion times.

Figure 2:
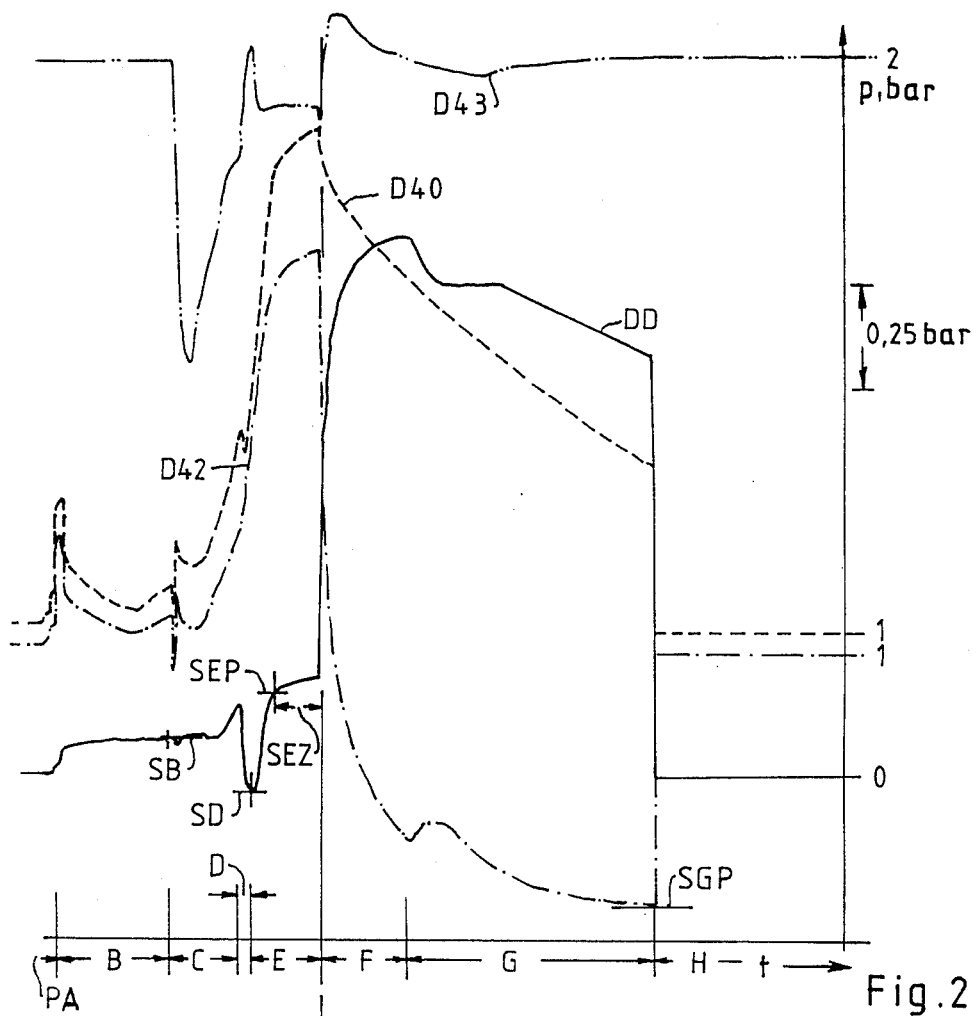
FIG. 2 shows pressure curves for one fusion cycle in the fusing chamber, the steam chamber and the supply device, as well as the pressure differential between the fusion and steam chambers.
Figure 3:
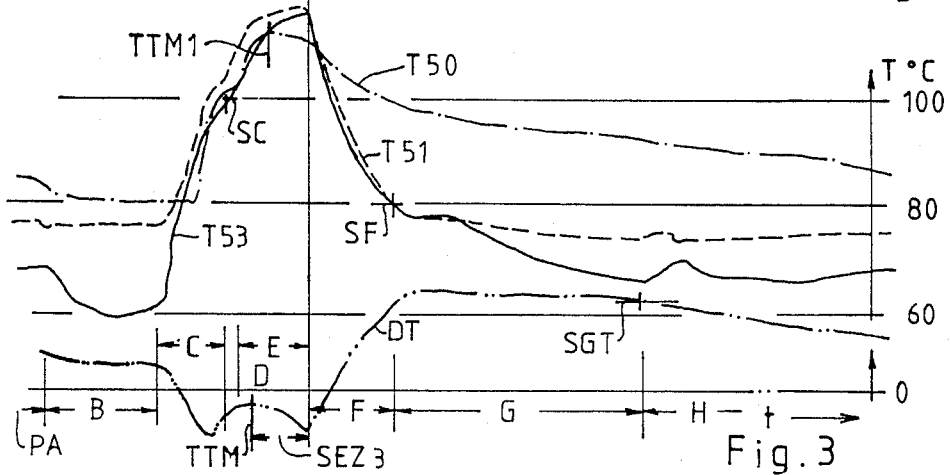
FIG. 3 shows temperature behaviour in the fused body, the mould wall and the condensation run-off, as well as the temperature differential between the agglomerated cake and the mould wall.

FIGS. 2 and 3 show the pressure and temperature curves respectively (D40, D42, D43; T50,-T51, T53) of one working cycle of the fusing device, which curves were measured with the corresponding sensors, whose reference numerals are given in the description. To make the details more easily recognizable the curves are represented with differing zero points, as marked at the axes. The relative scales are indicated there.

Furthermore, the pressure differential (DD) between the measured value curves at the fusing chamber pressure sensor (40), which signals the foaming pressure, and a steam chamber pressure sensor (41) and the temperature differential (DT) between the measured values at the agglomerated cake temperature sensor (50), which is guided with extensive thermal insulation through the mould wall and preferably projects slightly into the agglomerated cake, and a mould wall temperature sensor (51), which is connected thermally well with the mould wall (11), are shown in the Figures.

Every working cycle consists in a known way of successive phases, closure (PA), injection (B), heating (C), cross steam treatment (D), fusion (E), cooling (F), aeration (G) and mould release (H), which are determined by operation of the valves. In the closing phase (PA) the closing gear (17) is actuated until the mould is tightly closed. For injection (B) the injector valve (70) and the condensate valves (36) and (37) are opened, so that the injector air can escape through the nozzles (15) via the steam chambers (13, 14). Heating (C) occurs through the opening of the steam and condensate valves (30, 31; 36, 37). During cross steam treatment (D) the steam valve (30) is open to one of the steam chambers and the condensate valve (37) is open to the other. This phase can also be alternately twofold. For fusing (E) both steam valves (30, 31) are open; the condensate valves are closed, however. During cooling (F) the cooling water valves (34, 35) and the condensate valves (36, 37) are open and the vacuum valves (38, 39) are preferably also open. For aeration (G) the vacuum valves (38, 39) are open. Mould release (H) occurs through reverse operation of the closing gear (17). All valves not indicated as being open are shut.

The control criteria for the individual phases are given below.

Closure (PA) is completed when an end switch (65) indicates the closed state of the mould halves to the control device (60) and a hydraulic pressure of a certain height is signalled (not shown).

Injection (B) is completed when the measured pressure value at the injector pressure sensor (46) has risen by a predetermined amount in relation to the measured pressure value occurring shortly before injection starts. This predetermined value is a first control criterion (SB).

Heating (C) is completed when the condensate temperatures at the temperature sensors (53, 54) lie above a predetermined condensate temperature, the second control criterion (SC).

Cross steam treatment (D) is completed when the differential pressure (DD) has reached a predetermined value, i.e. the control criterion (SD).

Fusion (E) is completed when during the fusion period the differential pressure (DD) has exceeded a maximum, or a certain predetermined value, or the chamber pressure has exceeded a predetermined value, and a predetermined period has passed thereafter. Thus, two different control criteria (SEP, SEZ), i.e. the pressure criterion (SEP) and the time criterion (SEZ), are present here.

Alternatively, the end of the fusion phase (E) can also be determined from the differential temperature (DT), the time (TTM) at which the differential temperature maximum is reached being determined and thereafter a waiting period according to a time criterion (SEZ3) being added thereto; this maximum also indicates a certain fusion state which is extensively independent of the preprocessing of the material used.

The cooling phase (F) is ended, when the mould wall temperatures, which are indicated by the temperature sensors (51, 52), fall below a predetermined value, this being another control criterion (SF).

The aeration phase (G) is completed when the differential pressure (DD) has fallen below a predetermined value, the control criterion (SGP), and/or the differential temperature (DT) has fallen below a predetermined value, the control criterion (SGT).

The mould release phase (H) is completed when the end switch (66) on the closing gear (17) signals the open state or an optionally present mould-release control indicator indicates the conclusion of ejection.

All the phase times are defined according to predetermined maximum times, so that the process continues if a sensor fails, for example if the mould does not close completely as a result of incomplete filling or similar disturbances.

The pressure variations which arise in the steam generator (21) during loading through steam removal are shown by the pressure curve (D43). The variations depend inter alia on the line resistances and the storage capacities of the steam generator and the steam and fusion chambers and on the heat output of the steam generator. The supply pressures at the phase transitions (C, D, E, F) are different if the phase times or the control criteria are altered. These immediately affect the chamber and fusion pressure curves (D40, D42); the differential pressure (DD) is extensively independent of these, however, for which reason the control criterion (DEP) is determined in relation to said differential pressure (DD). Similarly, the vacuum during the aeration phase (G) is dependent on the supply and mould conditions, and added to this is the more or less vigorous propellant and moisture release of the agglomerated cake. This propellant and moisture release is substantially decisive for the differential pressure (DD), which consequently signals the drying and degassing state, and the control criterion (SGP) is therefore based on said differential pressure (DD).

Figure 4:
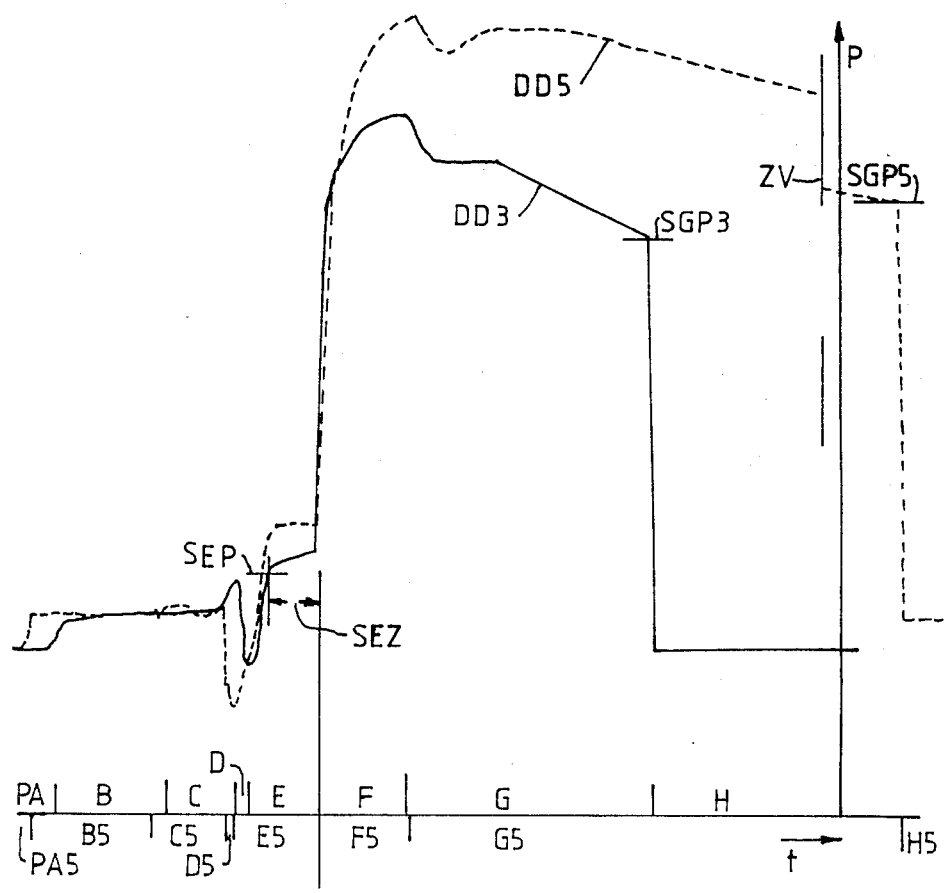
FIG. 4 shows differential pressure curves for various materials in adapted cycle sequences.
Figure 5:
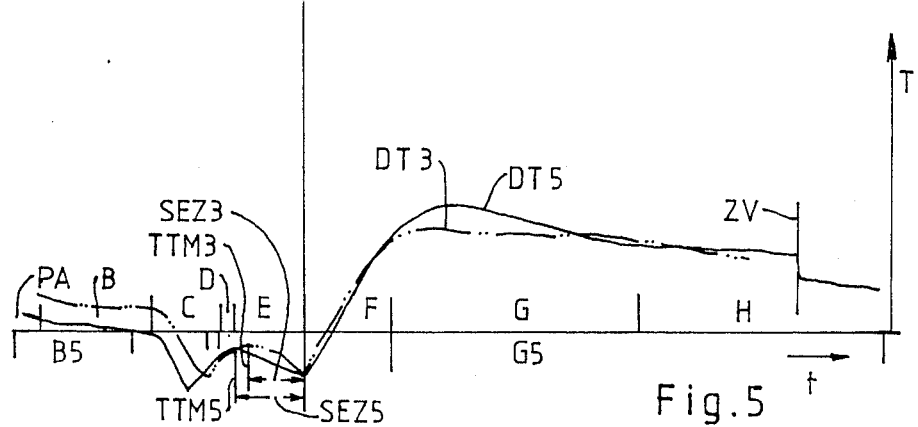
FIG. 5 shows differential temperature curves for various materials in adapted cycle sequences.

FIGS. 4 and 5 each show two curves, of the differential pressure (DD) and the differential temperature (DT) respectively of differently prefoamed materials intermediately stored for different lengths of time, for appropriately adapted cycle sequences. Plates 25×300×300 mm$^3$ in size were produced and materials with a density of 22 to 27 g/l were used. In this connection the propellant gas contents indicated of 3 and 5 percent by weight respectively are given in the reference numeral figures (DD3, DD5; DT3, DT5). Furthermore, the moisture content of the material with the high propellant gas content is increased by a short drying time. It has been shown that with a high propellant gas content and high moisture level the differential pressure rises higher in the fusion phase (E) and fusion requires more time.

During cooling and aeration, on the other hand, the differential pressure (DD5) drops very much more slowly because of greater degassing. After numerous cycles the control criteria (SGP3, SGP5) lie at different levels, owing to the adaptation which has occurred with regard to mould accuracy and residual moisture as characteristic quality values.

The differential temperature curves show similar curves to the differential pressure curves, depending on the propellant gas contents, for which reason they are also suitable for evaluation by a control criterion. A characteristic state of the fusion process is shown in all cases by the maxima in the fusion phase. This differential temperature curve (DT3, DT5) is hardly suitable to signal the end of the fusion phase by a simple temperature comparison with a control criterion, and even the differential pressures (DD3, DD5) exhibit only a gentle curve towards a suitable point at the end of the fusion phase (E), so that only relatively imprecise section areas of the pressure curves are available for a simple comparison. For this reason a comparison criterion (SEP) is provided in the steep climb of the pressure curve or the maximum timing (TTM) is provided and a further time control criterion (SEZ, SEZ2, SEZ5) for the additional waiting time up to the respective fusion phase end is included. The length of this waiting time extensively determines the strength of the fusion of the plastics beads, which is decisive for the characteristic quality values of the surface bonding strength and roughness.

The curve of the temperature (T50) of the agglomerated cake exhibits a pronounced maximum (TTM1) in the fusion phase (E), FIG. 3, which can aid control in conjunction with a time criterion.

FIGS. 4 and 5 have the same time scale, which is cut at the point ZV, as may be seen from the jump made by the signals. The alignment of the curve representations is based on the end of the fusion phases (E or ER), and the phase times are given in parallel scale calibrations by the phase designations (PA-H; PA5-H5). The different positions of the maximum times (TTM3, TTM5) with the accompanying time criteria (SEZ3, SEZ5) may be seen from the curves of the differential temperatures (DT3, DT5). Otherwise the curves are the same, for example, as those in FIGS. 3 and 4.

The cross steam treatment is predominantly decisive for inner fusion; for this reason a characteristic bending strength quality value is taken into account, the cross steam treatment control criterion (SD) thereby being substantially affected.

Figure 6:
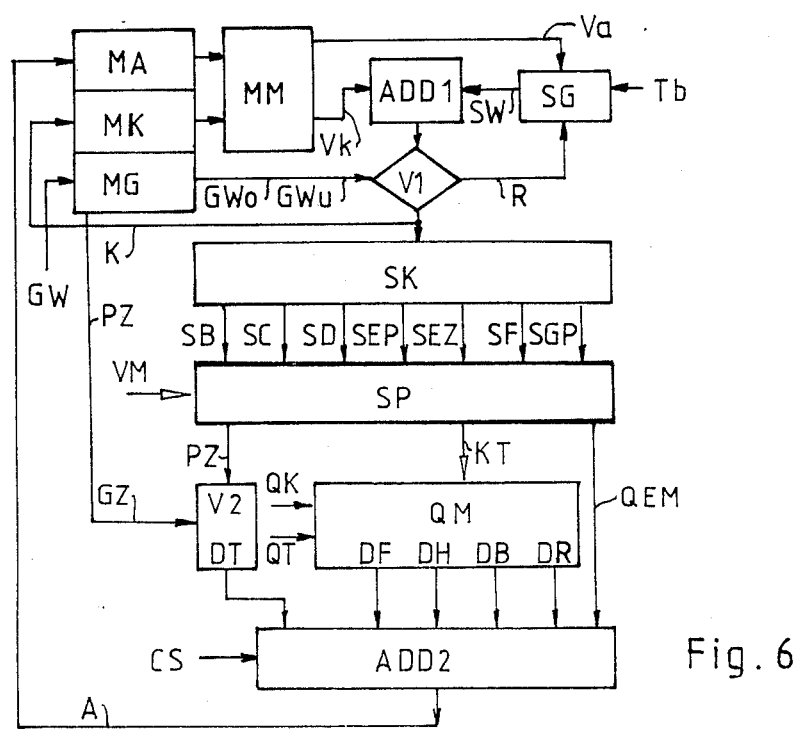
FIG. 6 is a block diagram of the adaptation process.

FIG. 6 shows a block diagram of the adaptation process. The plastics parts (KT) produced in the fusion process (SP) are supplied to a quality measurer (QM).

The characteristic quality values (QK): mould precision, moisture content, bending strength and surface roughness or bonding strength together serve to influence adaptation.

In the tests of FIGS. 2 to 5 the predetermined values were:
 bending strength 0.38–0.42 Newton/mm$^2$,
 compressive stress 0.17–0.21 Newton/mm$^2$,
 moisture 0.2 percent by volume,
 shrinkage and inflation 0.5 percent each.

For a fused plastics part (KT) the degree of shrinkage or post-expansion (DF), the deviation of the moisture content (DH) from a predetermined value, the deviation of the bending strength (DB) from a predetermined value and the deviation of the surface roughness (DR) from a predetermined value, each based on a permitted quality tolerance range (QT) as a normalizing quantity and considered in absolute terms, are each added in an adding unit (ADD2) and the sum is distributed as a quality deviation (A) related to the set of control criteria of the respective n-th cycle, whose accompanying values are indicated in the formulae of FIG. 8 with the index n, in the memory section (MA) to the set of criteria of the corresponding cycle, which is stored in the memory section (MK). There thereupon occurs a selection and elimination of the set with the greatest quality deviation (A), so that each time a certain number m of sets, e.g. 20, remains in the memory with the quality deviations, from which the average values of the control criteria (Vk) and the average value of the quality deviation (Va) are determined in the average generator (MM). Each set of control criteria (K) thus consists, for example, of the control criteria (SB, SC, SD, SEP, SEZ, SF, SGP) for the individual phases (B, C, D, E, F, G), and for each criterion the appropriate average value (Vk) is generated from the various sets, so that each individual control criterion is generated according to the specifications and classified in the new set. Within the lower and upper predetermined limit values (GWu, GWo), which define the respective tolerance range (Tb) and which are assigned to the memory section (MG) of the limit values (GW) together with time limit values (GZ), the statistical generator (SG) generates variance values (SW), which are added in the adder (ADD1) to the average criteria values (Vk), which each become new control criteria (K, k') by being tested for observation of the predetermined limit values (GWo, GWu) in the comparator (V1), which otherwise delivers a repeat signal (R) to the statistical generator (SG).

The new set of control criteria is filed in the control memory section (SK) and in the memory section (MK) for subsequent evaluation and possible average generation.

The statistical generator (SG) controls variance value generation with a controlled variance, which is determined by the average of the quality deviation (Va). Normalization of variance control is appropriately effected in that when the maximum quality deviation (Va) is reached the half width corresponds to the tolerance range (Tb). By restricting variance, when the quality of the parts improves, control moves, after a short response time of a few working cycles, substantially into the vicinity of the favourable average values; it thereby effects rapid convergence of adaptation.

Figure 7:
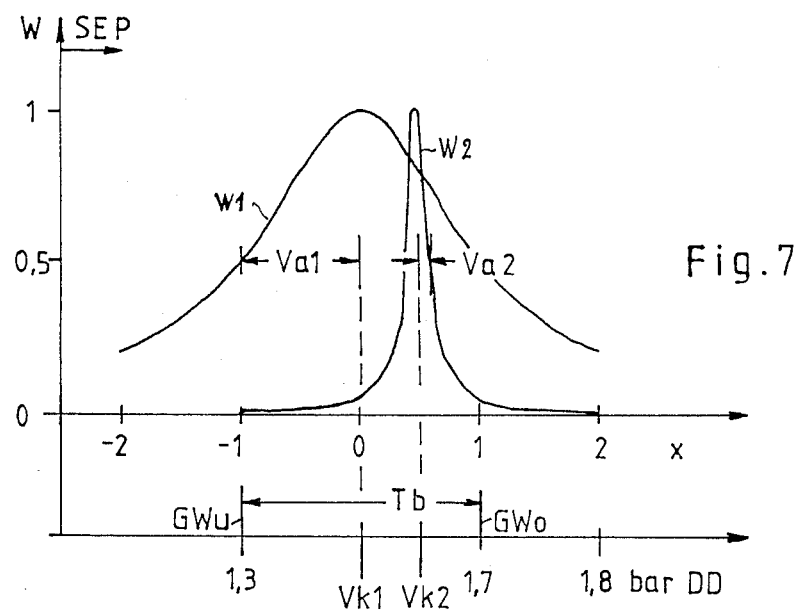
FIG. 7 shows the probabilities of the statistical variations for different adaptation stages for one control criterion of the differential pressure.

FIG. 7 shows the function of the statistical generator during generation of the control criterion (SEP). The two curves (W1, W2) show the probability (W), the highest probability being normalized to 1, with which the comparison values for the differential pressure (DD) are generated between the lower and upper limit values (GWu, GWo) of, in the example, 1.3 and 1.8 bar respectively each for different variances, corresponding to the average quality deviations (Va1, Va2) of 1 and 0.1 around different average values (Vk1, Vk2) with initially slight and subsequently good adaptation. The values outside the tolerance range (Tb) are suppressed by the comparator (v1), FIG. 6.

As is further shown in FIG. 6, another, advantageous embodiment of the process takes into account not only the quality of the plastics parts but also the economy of the process through evaluation of the time overshoot (DT), i.e. the amount by which the cycle time (PZ) exceeds a predetermined limit time (GZ). The time overshoot signal (DT) is additionally conveyed from the time comparator (V2) to the adder (ADD1) and thus enters the quality deviation (A). In this way, although high quality parts are produced, the control criteria are prevented from being so set that an unnecessary amount of time is required for the process. Instead of the process time the individual phase times can also be advantageously determined and evaluated according to the energy costs for steam, vacuum, compressed air, and cooling and be conveyed to the adder (ADD1).

An extension of the control device to the generation of control criteria for the operation of the prefoaming device is advantageously possible. Such control criteria are the density or moisture content of the prefoamed material, and the intermediate storage time or supply quantity, drying temperature or air velocity. The entire arrangement of the functional modules shown in FIG. 6 for the control of the fusion processor is contained in the control device (60), FIG. 1, and advantageously put into effect by a control program utilizing the existing memory (64) and an arithmetical and logical unit.

The pressure and temperature sensors (40-46; 50-54; 81, 83) in the fusion device and in the prefoaming and drying device are preferably each connected with digitizing and intermediately storing measured value converters, so that the control device can specifically recall the individual measured values via a single, digitally operating signal interconnection line. Signal distortion by contact potentials and interspersion of interference fields do not occur as they do with analog measuring signal lines.

Ad advantageous embodiment of these sensors consists in the fact that in the evaluation circuit upper and lower limit values are stored by the control device in local limit value memories and if the measured value exceeds or drops below one of these limit values a corresponding reply signal is supplied to the control device. Particularly suitable as digitizing converters for oscillations in the electrical oscillating circuit are excited pressure- or temperature-sensitive crystals, whose oscillation frequency is determined and evaluated by counting. An advantage of the process is that the measurement of the measured temperature and pressure values need not be calibrated, the reason being that only directional alterations and comparisons with preset values serve in evaluation, which are each based on previous measured values of the same sensor. Normalization and calibration of the sensors is thus unnecessary, and the measured values resulting from the measuring frequencies can be directly introduced into the working according to the process.

Alterations in the sensitivity of the sensors due to aging is also compensated automatically by the process. This is not the case, however, for the quality measuring device.

The control criteria and characteristic quality values described can also be replaced by similar criteria and values respectively or alternately varied statistically individually or in groups. This generally represents a complication of the process, however, and only in a few cases causes a better convergence of adaptation to favourable control criteria.

In a very simple version it is proposed that, instead of statistically generating pressure and temperature comparison values as control criteria, the time criteria for phase switch-off times should be directly determined statistically as control criteria within predetermined boundaries. In this embodiment, which is suitable for devices for producing simple products and in the processing of prefoamed material within tight tolerances, the pressure and temperature sensors are abandoned. This mode of operation is also appropriate when disturbances arise during operation at one of the relatively sensitive sensors.

If an equivalent parameter quality measurement (QEM) is carried out on the agglomerated cake in addition to or instead of the quality measurement (QM) on the finished plastics part (KT), the values thus obtained are also tested for observation of corresponding quality tolerance limits (QT) and conveyed to the adder (ADD2). A corresponding reversal of which values are to be taken into account is carried out via the control device with the control signal (CS), the control device also placing the corresponding measuring phases for testing the speed of pressure drop and the compressed air or steam permeability of the agglomerated cake in the working cycle sequence after cross evaporation or fusion respectively.

FIG. 8 shows the functions for generating the control criteria K and evaluating the quality deviations Va. The equations (I) indicate the probability W with which the variation x arises with an average quality deviation Va. A bell-shaped curve is provided therefor, c.f. FIG. 7. The maximum variation on both sides of the average is normalized at +2 to −2, so that variance values also occur in the total tolerance range (Tb) when the average value lies on a boundary of the tolerance range. The quality deviation is normalized to the range between 0 and 1.

The equations (II) describe the generation of the individual new control criteria K for the next control cycle n+1, which are determined from a statistical number pair x, y, the average quality deviation Va and the respective tolerance width Tb, which were established as n up to the current n-th cycle. At the same time the statistical number x, which has been multiplied with half of the tolerance width, is added as a variation to the corresponding average value of the criterion Vk. The generated criterion K is only allowed when the boundary conditions are fulfilled, i.e. that the statistical number y is smaller than the value of the admitted probability W and lies inside the limit values GWo, GWu. The number pair x, y has, for example, a series of equidistant values with an expansion of 0.01, i.e. of 400 and 100 values in equidistribution for x and y respectively.

The equation (III) indicates the repeat control R of the generation of a new statistical number pair x, y, if the criterion does not fulfil the boundary conditions given in (II). With the method given here criteria must therefore possibly be generated repeatedly on a trial basis, until the boundary conditions in (II) are fulfilled and a suitable new value has been found for the variation x. Monitoring of the boundary condition of the second statistical number y is contained in the statistical generator (SG), FIG. 6. This method can also be replaced by other types of controlled preparation of the variation x.

The equation (IV) shows the generation of an arithmetic average from a number m of the selected criteria K, indicated with the current index i, which are associated with the quality deviations A up to cycle n.

The selection of the sets of control criteria (K) on the basis of the quality criteria A is shown by equation (V). The greatest element (element max) is eliminated from the earlier set of quality criteria, which is described with the index n−1, with the addition of the last quality criterion.

The generation of the arithmetic mean Va from the m elements of the selected set of quality deviations A is indicated in the equation (VI).

We claim:

1. A control process for foaming and fusing plastics to be molded in a foaming and fusing device in which the control process operates in cycles, each cycle comprising the steps of:
   (a) providing a steam mold;
   (b) feeding a particulate foamable thermoplastic resin material into said mold;
   (c) heating said resin material in said mold;
   (d) cooling said foamed and fused article in said mold; and
   (e) releasing said foamed and fused article from said mold;
   (f) providing control criteria, comprising a time period, one of a pressure and a temperature limit value for the conditions evolving in the device such control criteria belonging to a certain cycle comprising a control criteria set, and with each cycle quality values of predetermined characteristics determined by measurements taken from the respective plastic part or an agglomerate cake situated in the device;
   (g) starting and completing a first cycle of each of said steps (b) through (e) in response to said control criteria;
   (h) generating values indicative of the quality of said fused material from said cycle;
   (i) starting and completing a second cycle of each of said steps (b) through (e) in response to further said control criteria;
   (j) generating a new set of said control criteria for each new cycle from prior said control criteria responsive to the quality values measured with such prior cycle of the control process,
   (k) combining the quality values of each cycle to provide a deviation and storing said deviation together with the control criteria set of the respective cycle in a control device store up to a predetermined number of such stored sets,
   (l) determinging criteria averages from each of the stored control criteria to determine an average of the stored quality deviations, and
   (m) for each cycle, determining a new set of control criteria through statistical variations of one or more of the control criteria around their criteria average with a variance determined according to the average quality deviation, such new set of control criteria being preset for the control of the next working cycle and the related quality values,
   (n) comparing said deviation being determined to the stored deviations and, if it is smaller than one of the stored deviations, replacing the set with the largest deviation in the store by the new one.

2. A control process according to claim 1, wherein the control criteria are the phase times of the feeding phase, heating phase, fusion phase, cooling phase and pressure release/aeration phase and optionally the phase time of cross steam treatment phases.

3. A control process according to claim 1, further including providing limiting values to the pressures in the agglomerated cake in at least one of the steam chambers and the supply and removal device and continuously signalling when a limiting value has been reached to the control device, the limiting values being the control criterion of at least on of the phases, injection, cross steam treatment, fusion and pressure release/aeration, the respective phase end being set for immediately after this respective limiting value is reached or in conjunction with a time criterion.

4. A control process according to claim 3, further including generating a differential pressure value, preferably from the pressure of the agglomerated cake and one of a steam chamber pressures and at least one control criterion preset as a comparison pressure, and determining the end of the fusion, the cross steam treatment or the pressure release/aeration phase respectively from arrival at this comparison pressure.

5. A control process according to claim 1, further including continuously signalling to the control device temperatures in the agglomerated cake, at least in one mold wall and/or at least in one removal connection, presetting the control criterion of at least one of the phases as an appropriate comparison temperature and setting the phase end for immediately after the comparison temperature has been reached or in conjunction with another control criterion.

6. A control process according to claim 5, further including continuously generating a differential temperature, preferably from the temperature of the agglomerated cake and one of the mold wall temperatures and presetting at least one control criterion as a comparison temperature for the differential temperature and determining the end of the heating, cooling or aeration phase respectively from arrival at the comparison temperature.

7. A control process according to claim 1, further including, as a control criterion for determining the end of the fusion phase, presetting a time criterion, measurement of which begins at the point when the temperature differential between temperatures in the agglomerated cake and one of the mold walls is at a maximum.

8. A control process according to claim 1, further including establishing the quality deviation by addition and in a predetermined quality tolerance range from the deviations of mold accuracy, moisture content, bending strength and/or surface roughness or bonding strength from the correspondingly predetermined characteristic quality values.

9. A control process according to claim 8, further including establishing the quality deviation, additionally or alternatively controlled by the control device, from at least one deviation, determined by measurement at the respective agglomerated cake, from the corresponding characteristic quality value, and preferably from its compressed air or steam permeability at the end of the cross steam treatment phase and/or the fusion phase.

10. A control process according to claim 8, further including establishing the quality deviation from the exceeding of a predetermined time limit by the cycle time.

11. A control process according to claim 1, wherein the tolerance range is defined by predetermined upper and lower boundary values and the control criteria by a probability which preferably corresponds to a bell-shaped curve and whose half variance corresponds to the average quality deviation, this being normalized in that the average quality deviation corresponds at most to half the tolerance range.

12. A control process according to claim 11, further including, for the determination of a criterion in a statistical generator, generating a variance value under the control of the average quality deviation and normalized by the tolerance range of the criterion in a permitted value range with double tolerance width, adding this variance to the average criteria value and testing the value generated in this way for observation of the range between the upper and lower boundary values and generating a repeat signal if this is not observed which causes renewed determination of the criterion with a new variance value and storing and presetting said criterion if it is observed to control the next cycle.

13. A control process according to claim 1, wherein at least one of the control criteria to be determined is a preset density, moisture content or intermediate storage time of the prefoamed material.

14. A control process according to claim 3, further including establishing the pressures in the agglomerated cake in at least one of the steam chambers and the supply and removal device by means of pressure sensors, which each contain a pressure-dependant, electrically excited oscillator, through evaluation of the oscillation frequency.

15. A control process according to claim 14, further including evaluation circuits contained locally in each pressure sensor, which evaluation circuits effect a comparison with the pressure comparison values stored therein by the control device and supply a reply signal to the control device if equality is present or if the comparison value is exceeded or fallen below.

16. A control process according to claim 5, further including establishing the temperatures in the agglomerated cake, in at least one mold wall and at least one removal junction by means of temperature sensors, which each contain a temperature-dependent, electrically excited oscillator, through evaluation of the oscillation frequency.

17. A control process according to claim 5, further including providing evaluation circuits contained locally in each temperature sensor, which evaluation circuits effect a comparison with the temperature comparison values each stored therein by the control device and supply a reply signal to the control device if equality is present or if the comparison value is exceeded or fallen below.

18. A controlled steam mold including: a foaming and fusion chamber surrounded by mold walls, steam chambers surrounding said mold walls, a supply device connected by controllable valves to said walls and chambers, a prefoaming and drying device, a controllable injector coupling said prefoaming and drying device to said fusion chamber, pressure and temperature sensors disposed in said fusion chamber, said mold walls, said steam chambers, a control device, said supply device and said prefoaming and drying devices having measuring signal lines connected to said control device, said control device being connected on the input side with an input device and a clock and characteristic quality value measuring devices and on the output side with control inputs of said valves, said supply device, said injector and said prefoaming and drying device, said control device including a memory in which preset data, comparison value and a control program for implementing the process are contained, said pressure sensors being pressure-dependent oscillation sensors containing a local frequency evaluation circuit, and means to transfer the evaluation result of said evaluation circuit in digital form to said control device via said measuring signal line.

19. A controlled steam mold according to claim 18, wherein the temperature sensors are temperature-dependent oscillation sensors, each containing a local frequency evaluation circuit, and means to transfer the evaluation result of said evaluation circuit in digital form to said control device via said measuring signal line.

* * * * *